Figure 1:
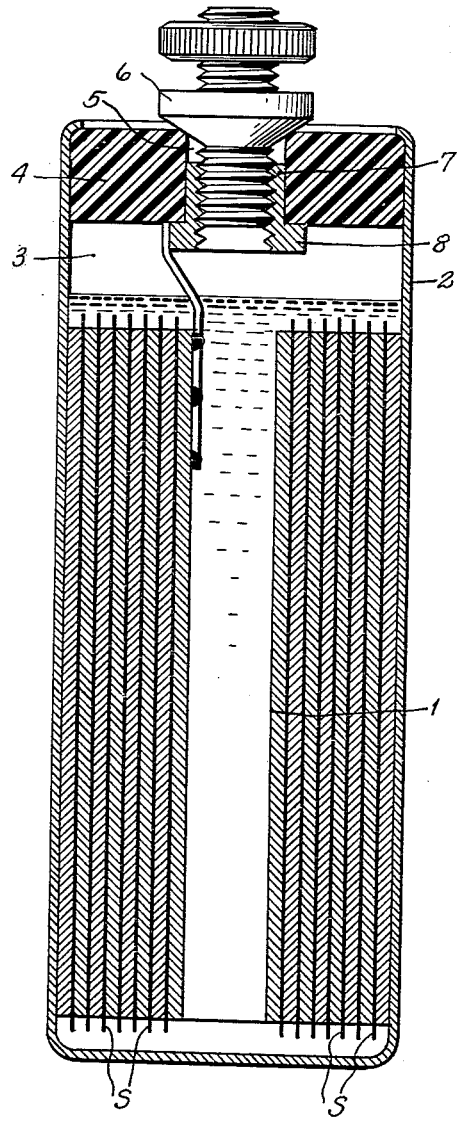

Oct. 16, 1962  H. VOGT  3,059,041
ALKALINE CELL AND METHOD OF OPERATING THE SAME
Original Filed April 2, 1953

INVENTOR.
HANS VOGT
BY
Kenyon & Kenyon
ATTORNEYS

United States Patent Office 3,059,041
Patented Oct. 16, 1962

3,059,041
ALKALINE CELL AND METHOD OF OPERATING THE SAME
Hans Vogt, Erlau, near Passau, Germany, assignor to Societe des Accumulateurs Fixes et de Traction (Societe Anonyme), Romainville, France, a company of France
Continuation of application Ser. No. 346,347, Apr. 2, 1953. This application Jan. 27, 1959, Ser. No. 789,347
Claims priority, application Germany Apr. 5, 1952
3 Claims. (Cl. 136—6)

This invention relates to certain improvements in or relating to alkaline elements. This application is a continuation of my copending application Ser. No. 346,347, filed April 2, 1953 (now abandoned.)

According to recent developments, alkaline cells are preferably constructed in such a way that the electrodes are tightly superposed, with separating layers, in the form of flat or spirally wound packages. The electrodes are in the form of thin sheets or foils and the surfaces on which the active substances are deposited, are enlarged as much as possible by pore canals. Thus, for instance, alkaline elements have been developed in which the electrodes, i.e. the anode and the cathode, are formed of very thin porous sintered structures or skeletons which are combined in the form of thick flat or spirally wound packages.

It has been found that operation of cells with such alkaline elements having thin electrodes of a thickness of 1 to 2 mms. and a large active electrode surface area in proportion to their electrode volume can be substantially improved as a result of the catalytic surface effect on the anode and cathode surfaces which are opposed to each other when separating layers permitting the passage of ions are interposed, since the internal pressure of the element in case of development of gas can be kept under control thereby. To this end, the casing of the element is formed by a pressure vessel, more particularly, by a pressure vessel in the form of a cartridge which permits permanently an increased internal pressure which is favorable for the catalysis.

Contrary to other proposals for controlling the internal pressure in alkaline storage batteries by catalysis, according to the present invention the surfaces of the electrodes evolving gas are disposed as close together as possible and the combination of the gas ions required for the catalysis owing to their generation in close proximity takes place with very short paths of approach, i.e. in a very short period of time. Thus the quantity of gas which can be catalysed in the unit of time is correspondingly large and consequently the development of gas in the same unit of time can also be large. This means that a secondary element according to the present invention can be charged with a relatively high charging current. Thus it is possible to reduce the charging time and to increase the period of time where the element is ready for service.

In tests carried out with a gastightly closed element according to the invention there was provided in the casing of the element a space occupying about 10 percent of the total inner space of the casing, which space was free from electrolyte and served as a pressure cushion. The rest of the internal space of the casing was occupied by a wound electrode package consisting of a sintered anode foil, a sintered cathode foil, and an interposed lye-resistant finely perforated strip of textile fabric serving as a separator. The internal space of the casing was tightly filled up by the wound layers. The casing was filled with electrolyte, i.e., potassium hydroxide except for the gas space forming the pressure cushion. The mutually opposed surfaces of the anode and cathode forming the spirally wound electrode package were only separated from each other by the intermediate fabric layer and the distance between the two electrodes accordingly was about 0.2 mm. A small alkaline element constructed in this way has an electrical capacity of about 0.5 amp-hr. and owing to its internal resistance of >0.1 ohm/amp.-hr. permits discharging currents up to about 6 amp. at a voltage drop of about 10%, i.e. at a voltage of 1.2 volts $-0.12=1.08$ volts. The element was subjected to a continuous charging with a charging current of 0.1 amp. Hereat, a rise of pressure in the casing of the element of up to 20 atmospheres excess pressure was measured. At this pressure a state of equilibrium exists between the quantity of gas evolved and the quantity of gas returned into the electrolyte by the catalytic effect, without any additional measures or devices, such as the use of spongy platinum or the like being required. The cathode is formed in known manner of cadmium hydroxide as an active mass and as is well known, hydrogen is produced at the same in case of excessive charging, which hydrogen depending upon the internal pressure of the casing will diffuse into the electrolyte, more particularly into the water constituent thereof, or combine in the form of gas bubbles which are forced through between the tightly packed electrodes into the gas space above the electrolyte. In the same way, when overcharging the element, oxygen is produced at the anode having nickel hydroxide as an active substance, which oxygen also either diffuses into the electrolyte or is forced into the gas collecting space, in the form of gas bubbles. In view of the small distance between the anode and cathode surfaces, which moreover is substantially filled up by the separator layer, already small quantities or movements of such gas bubbles are sufficient to cause the combination (gas mixture) required for the catalytic effect, as found out by experiment, both on the anode and on the cathode, resulting under action of the high internal pressure in the casing in the reconversion of hydrogen and oxygen into water. The gas collecting space in an alkaline element according to the present invention serves merely to regulate the pressure and the attainable effect of catalytic reconversion of the gas depends upon the existence of the pressure cushion thus created.

By way of alternative, the electrodes can be superposed in the form of flat foils which are carried by a bar forming the contact for either type of electrode (anode or cathode), and separated from each other by a separator layer. In this case, the catalytic effect can be attained as well.

It is also possible to use for the construction of a gas-tightly closed alkaline accumulator according to the present invention thin sheets or foils which have been produced by any other known manufacturing process and having no highly porous sintered structure for the deposition of the electro-chemically active substance. Such electrodes can be formed by metallic foils whose preferably roughened surface is coated with electro-chemically active substance. Also, thin electrodes produced by a metal spraying process (Schoop process) can be used for the element according to the present invention.

Other and further objects, features and advantages of the invention will be pointed out hereinafter and appear in the appended claims forming part of the application.

In the accompanying drawings several new preferred embodiments of the invention are shown by way of illustration and not by way of limitation.

Figure 2:
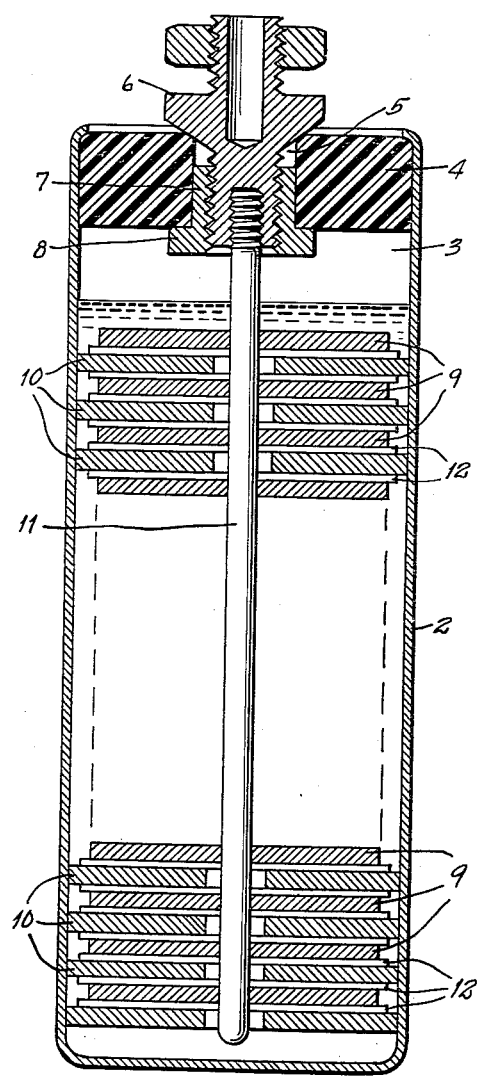

FIG. 1 is a vertical section through one form of secondary cell having the invention applied thereto, and FIG. 2 is a vertical section showing a modification thereof.

Similar reference numerals denote similar parts in the different views.

In the embodiment as per FIG. 1 the pack 1 formed of spirally wound porous sintered electrode foils is fitted in a metallic pressure vessel 2. The tightly wound layers forming the anode and the cathode are insulated and separated from each other by a separator layer S which must be permeable to ions and liquid. The separator S has a thickness not exceeding 0.2 mm. The remaining free space within the casing is filled up with electrolyte, i.e., potassium hydroxide (KOH), to such an extent that a gas collecting space 3 is left to form a pressure cushion for influencing the catalysis at the electrode surfaces. Owing to the small volume of the space 3 the pressure will rise quickly when overcharging the element and the catalytic action is thereby quickly adapted to the evolved quantity of gas, the surface effect at the wound layers being utilized for the catalysis. The closure of casing 2 is formed by a cover 4 of plexiglass which is forced into the casing 2 with a pressure exceeding the specified admissable pressure of the casing so as to resist the pressure occurring in operation of the element. A bore 5 in the cover 4 permits the electrolyte to be filled into the casing after the assembling, or to change the electrolyte after a longer period of use. The attainable catalytic effect, more particularly in case of a rapid production of gas, depends upon the proportion of the gases, i.e. upon the ratio of oxygen and hydrogen. It has been found out that the production of hydrogen at the cathode of the element will begin earlier than the production of oxygen at the anode when a cell according to the invention is first put into operation. Owing to the fact that the gases are not present in their equimolecular proportions, but in a ratio of 5:1 or even more between hydrogen and oxygen, the catalysis intended to control the internal pressure of the casing will occur only to a small extent or not at all. According to an important feature of the present invention, therefore, the gases are allowed to escape as the cell is charged for the first time. In the further course of the charging and discharging operations oxygen and hydrogen are developed in the stoichiometric ratio, so that the catalysis becomes fully effective. The closure screw 6 for the cover opening 5 simultaneously forms one pole of the element, while the other connection (cathode) is formed by engagement of the outer layer of the coiled electrode sheet with the inner wall of the casing 2. When tightening the closure screw 6, the conical packing surface of the same is pressed against the outer edge of the cover bore, which may be bevelled accordingly. An additional seal for the opening 5 is formed by the flanged portion 8 of the nut member 7 of the closure device engaging the underside of the cover 4 of the casing.

In the modification as per FIG. 2 the electrodes are in the form of annular discs 9, constituting the anodes, and annular discs 10, constituting the cathodes. The anode plates 9 have an outer diameter which is smaller than the inner diameter of the casing and they are fixedly seated on the central contact bar 11 by their central bore. The cathode discs 10 on the contrary are tightly fitted in the casing 2, so as to be in tight engagement and electrical contact with the inner wall thereof, while their central bore is larger than the diameter of the conatct bar 11. Interposed between the tightly packed anode and cathode discs are separators in the form of thin insulating layers 12.

It is also contemplated to fit the anode in the casing in charged condition while the cathode is fitted in non-charged condition, whereby oxygen is evolved soon after the beginning of the charging process owing to overcharging of the anode. Thus the excess of hydrogen which is detrimental for the catalysis can be avoided.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

What is claimed is:

1. An alkaline storage battery cell comprising a hermetically permanently sealed pressure-resistant vessel capable of resisting internal pressures up to at least 20 atmospheres and accommodated therein a spirally wound coil of thin foil anode and cathode electrodes of porous sintered metallic material having respectively positive and negative active materials incorporated therewith and each having a large active electrode surface area in relation to the electrode volume, and a lye-resistant separator of porous textile material wound up with the electrodes in the coil and sandwiched between the adjacent active anode and cathode electrode surfaces and having a thickness not exceeding 0.2 mm., said separator having fine perforations which are permeable to ions and liquid, and a potassium hydroxide electrolyte in the cell, said coil being completely immersed in said electrolyte but said electrolyte occupying substantially less than the full empty space in the hermetically sealed vessel so as to leave a gas space of about 10 percent of the total inner space of the vessel and said electrodes and separator in the wound coil having their adjoining surfaces held together in intimate contact by the engagement of the outside of the outermost electrode surface with the inner surface of the vessel so as to prevent the electrodes from unwinding and disengaging the intermediate separator layers, and said anode electrode being inserted into said vessel initially in a charged condition while said cathode electrode is inserted into said vessel initially in non-charged condition, said cell being then initially charged so as to allow gases to escape and then being sealed whereby the gases developed on the surface of the electrodes during use thereafter when the cell is overcharged or overdischarged with its normal charging current are consumed by catalytic transformation under action of the gas pressure produced in the vessel in the state of equilibrium.

2. An alkaline storage battery cell comprising a hermetically permanently sealed pressure-resistant vessel capable of resisting internal pressures up to at least 20 atmospheres and accommodated therein thin flexible foil anode and cathode electrodes of porous sintered metallic material in the form of a spirally wound coil, said electrodes having respectively positive and negative active material incorporated therewith and each having a large active electrode surface area in relation to the electrode volume, a lye-resistant separator of porous textile material sandwiched between the adjacent active electrode surfaces and having a thickness not exceeding 0.2 mm., said separator having fine perforations which are permeable to ions and liquid, and an alkaline electrolyte of potassium hydroxide in the cell, said electrolyte occupying less than the full empty space in the hermetically sealed vessel so as to leave a free gas space of about 10 percent of the total inner volume of the vessel and said electrodes and separator in the wound coil having their adjoining surfaces held together in intimate contact by the engagement of the outside of the outermost electrode surface with the inner surface of the vessel so as to prevent the electrodes from unwinding and disengaging the intermediate separator layers, said anode electrode being initially in a charged state when inserted into said vessel, and said cathode electrode being initially in a non-charged condition when inserted into said vessel, said cell being then initially charged so as to allow gases to escape and then being sealed whereby the gases developed on the surface of the electrodes during use thereafter when the cell is overcharged or overdischarged with its normal charging current are consumed by catalytic transformation under action of the gas pressure produced in the vessel in the state of equilibrium.

3. A permanently sealed alkaline storage battery cell comprising a pressure-resistant metallic vessel capable of resisting internal pressures up to at least 20 atmospheres, a wound coil within the vessel consisting of thin foil anode and cathode electrodes, each of porous sintered metallic material having respectively positive and negative active materials incorporated therewith and each having a large electrode surface area in relationship to electrode volume, and an alkali-resistant separator of porous textile fabric sandwiched between and in intimate contact with adjacent anode and cathode electrode surfaces and having a thickness not exceeding 0.2 mm., said separator having fine perforations which are permeable to ions and liquid, an alkaline electrolyte of potassium hydroxide in said vessel, said coil being totally immersed in said electrolyte and said electrolyte filling unoccupied space in the vessel to such an extent as to leave a free volume in the vessel equal to approximately 10% of the total inner volume thereof, the adjacent electrode and separator faces in the coil being maintained in intimate contact throughout by tight confinement of the coil within the inner walls of said vessel which being pressure resistant prevents separation and disengagement between said faces, the anode electrode of the coil being charged prior to insertion into said vessel and the cathode electrode of the coil being uncharged prior to insertion into said vessel, a cover for said vessel having a sealable opening, said cell with the wound coil and the electrolyte therein being initially charged with said opening unsealed, and means for hermetically sealing said opening subsequent to the initial charging of said cell whereby the gases delivered on the surfaces of the electrodes during use thereafter and when the cell is overcharged or overdischarged with its normal charging current are consumed by catalytic transformation under action of the gas pressure developed in the free space within the vessel when a state of equilibrium under these conditions occurs there.

References Cited in the file of this patent
UNITED STATES PATENTS

| | | |
|---|---|---|
| 2,463,565 | Ruben | Mar. 8, 1949 |
| 2,487,499 | Webb | Nov. 8, 1949 |
| 2,614,138 | Jacquier | Oct. 14, 1952 |
| 2,646,455 | Jeannin | July 21, 1953 |
| 2,651,669 | Neumann | Sept. 8, 1953 |
| 2,677,006 | Ameln | Apr. 27, 1954 |
| 2,696,515 | Koren et al. | Dec. 7, 1954 |
| 2,903,496 | Vogt | Sept. 8, 1959 |